(12) United States Patent
Yamagishi et al.

(10) Patent No.: US 6,178,338 B1
(45) Date of Patent: Jan. 23, 2001

(54) COMMUNICATION TERMINAL APPARATUS AND METHOD FOR SELECTING OPTIONS USING A DIAL SHUTTLE

(75) Inventors: Harumi Yamagishi, San Diego; Jason Kenagy, La Jolla, both of CA (US)

(73) Assignees: Sony Corporation, Tokyo (JP); Sony Electronics, Inc., Park Ridge, NJ (US); Qualcomm Incorporated, San Diego, CA (US)

( * ) Notice: Under 35 U.S.C. 154(b), the term of this patent shall be extended for 0 days.

(21) Appl. No.: 08/845,851

(22) Filed: Apr. 28, 1997

(51) Int. Cl.[7] .................................................. H04Q 7/32
(52) U.S. Cl. ............................................. 455/566; 455/575
(58) Field of Search .................................... 455/575, 550, 455/556, 564, 566, 38.4; 345/146, 352; 379/93.17, 93.23

(56) References Cited

U.S. PATENT DOCUMENTS

| | | | |
|---|---|---|---|
| 5,396,264 | 3/1995 | Falcone et al. | 345/146 |
| 5,436,954 * | 7/1995 | Nishiyama et al. | 455/566 |
| 5,479,476 * | 12/1995 | Finke-Anlauff | 455/550 |
| 5,761,610 * | 6/1998 | Sorensen et al. | 455/575 |
| 5,905,964 * | 5/1999 | Sudo | 455/566 |
| 5,915,228 * | 6/1999 | Kunihiro et al. | 455/566 X |

FOREIGN PATENT DOCUMENTS 0 726 668 A1    8/1996    (EP) .

* cited by examiner

Primary Examiner—Fan Tsang
Assistant Examiner—Philip J. Sobutka
(74) Attorney, Agent, or Firm—Frommer Lawrence Haug, LLP.; William S. Frommer; Glenn F. Savit (57) ABSTRACT

Cellular telephone which utilizes a dial shuttle for selecting functions listed in various option lists to be performed. The dial shuttle is depressed by a user to call up a particular option list menu (option group) on the telephone's display. Upon depression of the dial shuttle, one of the option groups stored in memory that is associated with the current operating mode of the device is retrieved, wherein each of the stored option groups is associated with a respective operating mode and includes a respective plurality of functions for selection by a user during the respective operating mode. The current operating mode pertains not only to whether a telephone call is taking place but also to the number of digits that have been entered into the cellular telephone. The retrieved option group is displayed and the dial shuttle is utilized by the user to selected one of the displayed functions for execution.

10 Claims, 6 Drawing Sheets

| CASE | CONTEXT | OPTION LIST |
|---|---|---|
| 1 | When user enters more then 2 digits in standby | Find Number<br>Send<br>Store<br>Enter Pause<br>Enter Link<br>Enter Hyphen |
| 2 | When user enters 1 or 2 digits in standby | Recall Loc#<br>Send<br>Store<br>Enter Pause<br>Enter Link<br>Enter Hyphen |
| 3 | When user enters more then 2 digits in a call | Mute<br>Send<br>Store<br>Number Tone<br>Find Number<br>Enter Pause<br>Enter Link<br>Enter Hyphen |
| 4 | When user enters 1 or 2 digits in a call | Mute<br>Send<br>Store<br>Number Tone<br>Recall Loc#<br>Pause<br>Enter Link<br>Enter Hyphen |

FIGURE 3A

| CASE | CONTEXT | OPTION LIST |
|---|---|---|
| 5 | When user recalls number from phone book in standby | Erase<br>Send<br>Edit<br>Restriction<br>View Number |
| 6 | When user recalls number from phone book in a call | Mute<br>Send<br>Edit<br>Erase<br>Restriction<br>View Number<br>Number Tone |
| 7 | When user recalls number from call history in standby | Store<br>Send<br>Duration<br>Time/Date<br>View Number<br>Erase<br>Number Tone |
| 8 | When user recalls number from call history in a call | Mute<br>Send<br>Store<br>Duration<br>Time/Date<br>View Number<br>Erase<br>Number Tone |
| 9 | When user enters number to the scratchpad in standby | Enter Pause<br>Store<br>Enter Link<br>Enter Hyphen |
| 10 | When user enters number to the scratchpad in a call | Mute<br>Store<br>Enter Pause<br>Enter Link<br>Enter Hyphen<br>Number Tone |
| 11 | When the call back number in SMS/VMA is displayed | Send<br>Store |

COMMUNICATION TERMINAL APPARATUS AND METHOD FOR SELECTING OPTIONS USING A DIAL SHUTTLE

BACKGROUND OF THE INVENTION

This invention relates to a cellular telephone and, more particularly, to communication terminal apparatus and method for selecting options using a dial shuttle.

Cellular telephones, personal communication (e.g., PCS) devices and other similar products are being utilized in greater numbers each day. Currently, there has been much effort to reduce the size of such portable devices (hereinafter, simply referred to as "cellular telephones"). Several techniques for reducing the size of cellular telephones include utilizing smaller batteries, reducing the size of internal circuitry, reducing the size of the display, and utilizing pull-out antennas in place of fixed antennas. Other techniques include reducing the size of the input keys and reducing the distance (i.e., spaces) between those input keys. However, as input keys get smaller in size, or even just closer together, the utilization of those keys and thus cellular telephones becomes increasingly more difficult.

Another technique for reducing the size of cellular telephones while maintaining suitably-sized input keys is to reduce the number of necessary input keys. One known technique for doing this is to assign multiple functions to the same input key (e.g., the "2" key) wherein one action occurs when the user depresses a particular key in a particular mode of the cellular telephone, and another action occurs when that key is depressed in another operating mode. For example, cellular telephones having alphanumeric displays generally allow a user to enter an identifying name that includes letters, numbers, special characters or any combination thereof using, for example, input keys 0–9 in one or more modes of operation, but those same input keys are used to input a telephone number (i.e., numbers only) in another operating mode. As another example, the "*" and "#" keys are used both for entering "*" and "#" characters (representing, e.g., a pause) in a telephone number and for scrolling through various lists including a previously stored telephone number list. While the "assigning" of multiple functions to the same input key has led to the reduction in the required number of input keys on the face of the cellular telephone, thus leading to a possible reduction in the size of the cellular telephone itself, there still is great demand to further reduce the size of the cellular telephone or, at least, the number of necessary input keys thereof without increasing the difficulty in utilizing the device.

OBJECTS OF THE INVENTION

Therefore, it is an object of the present invention to provide communication terminal apparatus and method for selecting options using a dial shuttle which overcome the shortcomings of the above-described devices.

Another object of the present invention is to provide a communication terminal apparatus which includes a dial shuttle for selecting options and which utilizes relatively few input keys, but which also is relatively simple to use.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, communication terminal apparatus and method are provided for entering an appropriate input (e.g., depressing) by a user an input device or switch (e.g., a dial shuttle) during a current operating mode of the communication terminal apparatus, retrieving option list data corresponding to one of a plurality of option groups that is associated with the current operating mode of the communication terminal apparatus, wherein each of the stored option groups is associated with a respective operating mode of the communication terminal apparatus, and each of the option groups includes one or more functions for selection by a user during the respective operating mode, and displaying, when the input switch is switched by the user, at least a portion of the retrieved option group that includes the functions for selection by the user during the current operating mode.

As one aspect of the present invention, each of the option groups that is associated with a respective operating mode includes only those functions that are utilized during the respective operating mode.

As another aspect of the present invention, the current operating mode is determined from both the user-entered data and whether the apparatus is operating in call mode or in standby mode.

As yet a further aspect of the present invention, the identified function in the displayed option group is performed when the input switch is switched a second time.

As yet another aspect of the present invention, the most frequently selected function of the displayed option group is initially selected when the list is initially displayed.

As a feature of this aspect, the two functions adjacent to the most frequently selected function of the displayed option group represent second and third-most frequently selected functions such that scrolling up or scrolling down the option group once would select either the second-most or third-most frequently selected function.

Still yet a further aspect of the present invention, the option list data that corresponds to some or all of the option groups are generated.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
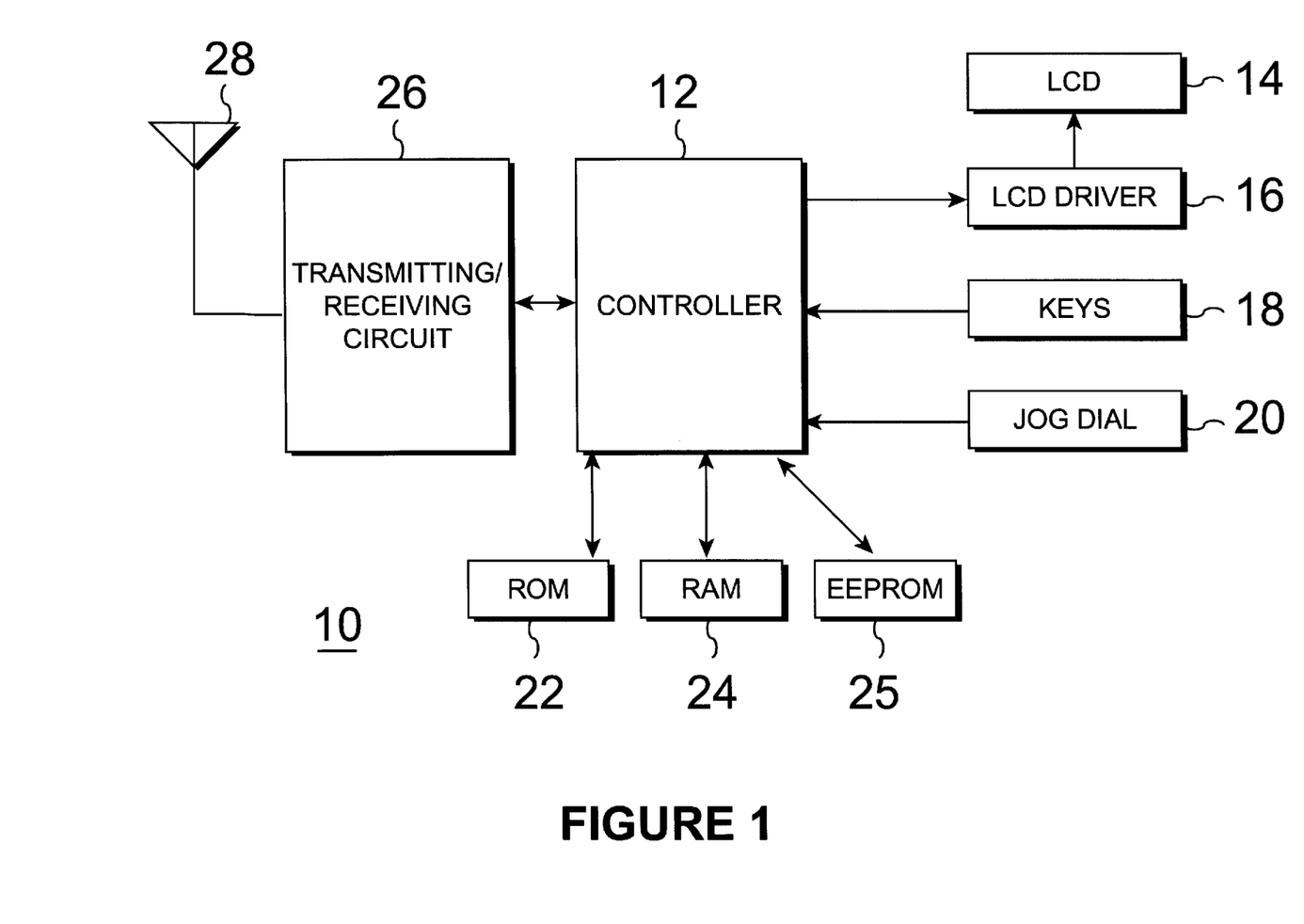
FIG. 1 is a block diagram of the cellular telephone of the present invention.

Referring now to the drawings, FIG. 1 is a block diagram of cellular telephone 10 of the present invention. As shown, cellular telephone 10 is comprised of a controller 12, a liquid crystal display (LCD) 14, an LCD driver circuit 16, input keys 18, a jog dial 20 (also identified herein as a dial shuttle), a read-only memory (ROM) 22, a random access memory (RAM) 24, an electrically erasable and programmable read only memory (EEPROM) 25, a transmitting/receiving circuit 26, and an antenna 28. Controller 12 provides the means for carrying out most of the functions of cellular telephone 10 utilizing the permanently stored operation program stored in ROM 22, using RAM 24 for storing temporary data, and using EEPROM 25 for storing programmable setting data, e.g., a phonebook. Input keys 18 and jog dial 20 in accordance with the present invention provide the means by which a user of the cellular telephone enters data and makes selections (to be further discussed). LCD driver 16 drives display 14 in response to control signals supplied from controller 12. Transmitting/receiving circuit 16 transmits and receives via antenna 28 RF signals to and from a cellular telephone base station (not shown). Since the construction and operation of transmitting/receiving circuit 26, LCD driver 16 and antenna 28 are well known in the art and form no part of the present invention, further description thereof is omitted herein, except where it is necessary for an understanding of the present invention. Also, although display 14 is described herein as being a liquid crystal display (LCD), other suitable displays may be used.

As will be further mentioned, while the present invention is described as pertaining to the operation of a cellular telephone, the present invention is not limited thereto and may easily be applied to other types of mobile devices including, but not limited to, a PCS device, a beeper, a remote control (e.g., for use with a television, a VCR, etc.), a mobile personal electronic portfolio, etc.

Figure 2:
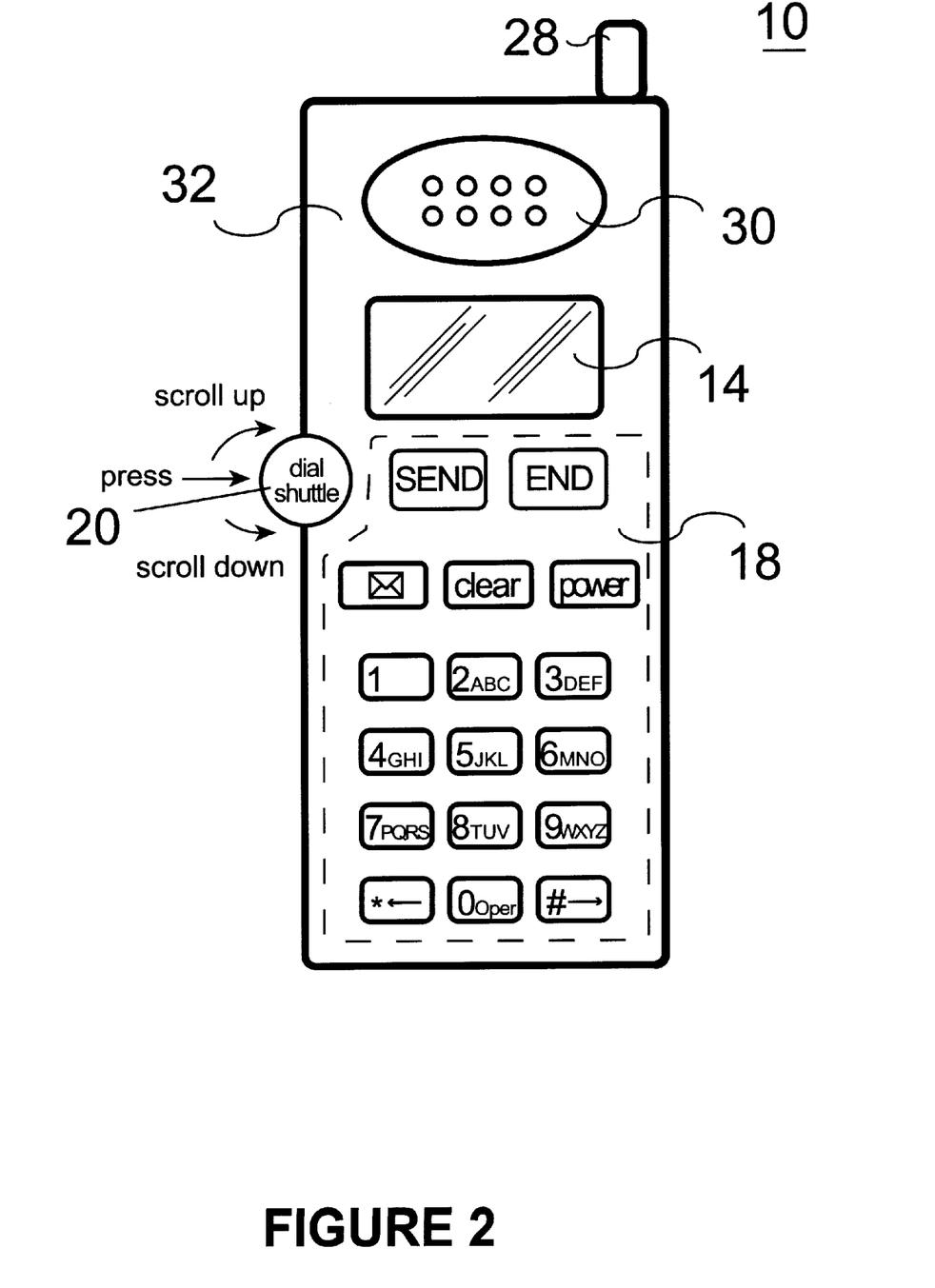
FIG. 2 is a schematic illustration of the face of a cellular telephone having a dial shuttle in accordance with the present invention.

FIG. 2 is a schematic illustration of the "face" 32 of cellular telephone 10 of the present invention and which is shown as being comprised of input keys 18, dial shuttle 20, display 14, and a speaker 30. Also shown, while generally not on the face, is antenna 28 which may be of the "pull-out" type. Face 32 of cellular telephone 10 also may include a microphone (not shown) into which a user speaks, although the microphone may be provided in a separate pull-out extension of the cellular telephone or in the "flip" cover thereof. It is noted that the operation and functions of antenna 28, speaker 30 and the microphone are well known in the art and form no part of the present invention.

As shown in FIG. 2, input keys 18 include numeric input keys 0–9, a "#" key, an "*" key, a "SEND" key, an "END" key, a "CLEAR" key, and a "POWER" key. These keys exist on practically all cellular telephones and, thus, their respective functions and design are well known in the art.

Dial shuttle 20, in accordance with the present invention, is operable to be moved by the user to an up position, to a down position, or to a depressed position. Any appropriate switch that is switchable to at least three positions may be used as dial shuttle 20, but in the preferred embodiment of the present invention, dial shuttle 20 is easily moved to either the up or down positions by a user or to a depressed position, wherein the switch possibly "clicks" upon depression to notify the user of the depression thereof. Alternatively, dial shuttle 20 may be moved either to a right position or to a left position, instead of the up and down positions, but for the purpose of the description herein, dial shuttle 20 is movable only into the up position, the down position, and the depressed position.

In accordance with the present invention, dial shuttle 20 operates to scroll through various menus displayed on display 14 when the user moves dial shuttle 20 into its up or down positions, and is operable to select the particular entry in the displayed menu that is highlighted for subsequent execution by the cellular telephone when dial shuttle 20 is depressed. However, dial shuttle 20 does not simply provide for the scrolling and selection of an entry in a displayed menu, but, in accordance with the present invention, when dial shuttle 20 is moved (i.e., depressed or, alternatively, moved in any direction), a particular menu is displayed on display 14 corresponding to the current state of cellular telephone 10 (to be discussed), and the first entry that is highlighted in the displayed menu corresponds to that entry therein that has the highest frequency of use (also to be discussed).

Figure 3A:
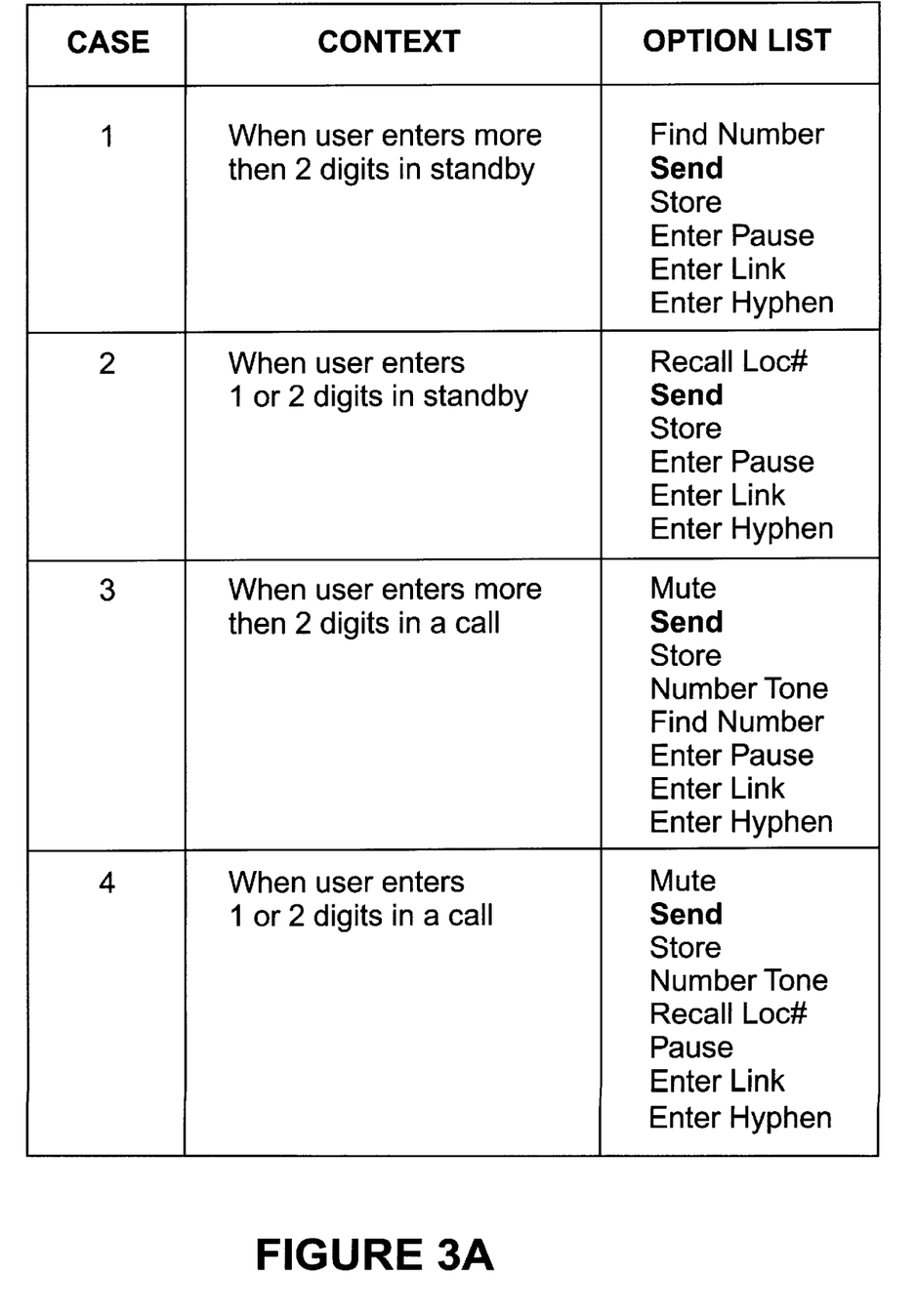
FIGS. 3A and 3B are tables used for explaining the operation of the dial shuttle during various operating modes in accordance with the present invention.
Figure 3B:
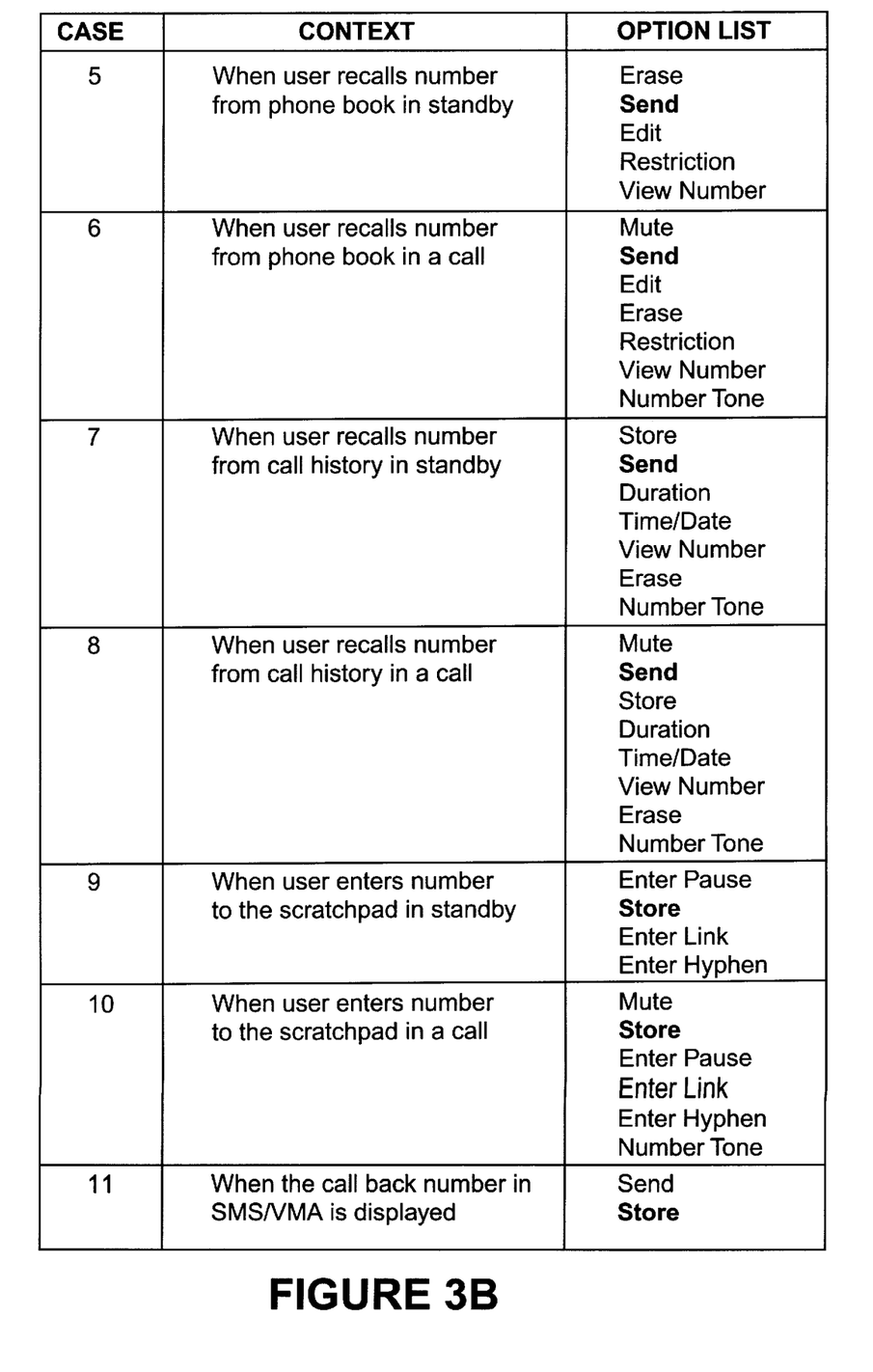

The operation of cellular telephone 10 using dial shuttle 20 will now be discussed with reference to the Tables shown in FIGS. 3A and 3B. FIGS. 3A and 3B illustrate the different menus that are displayed when dial shuttle 20 is moved or depressed in the various operating modes of the cellular telephone.

Figure 4:
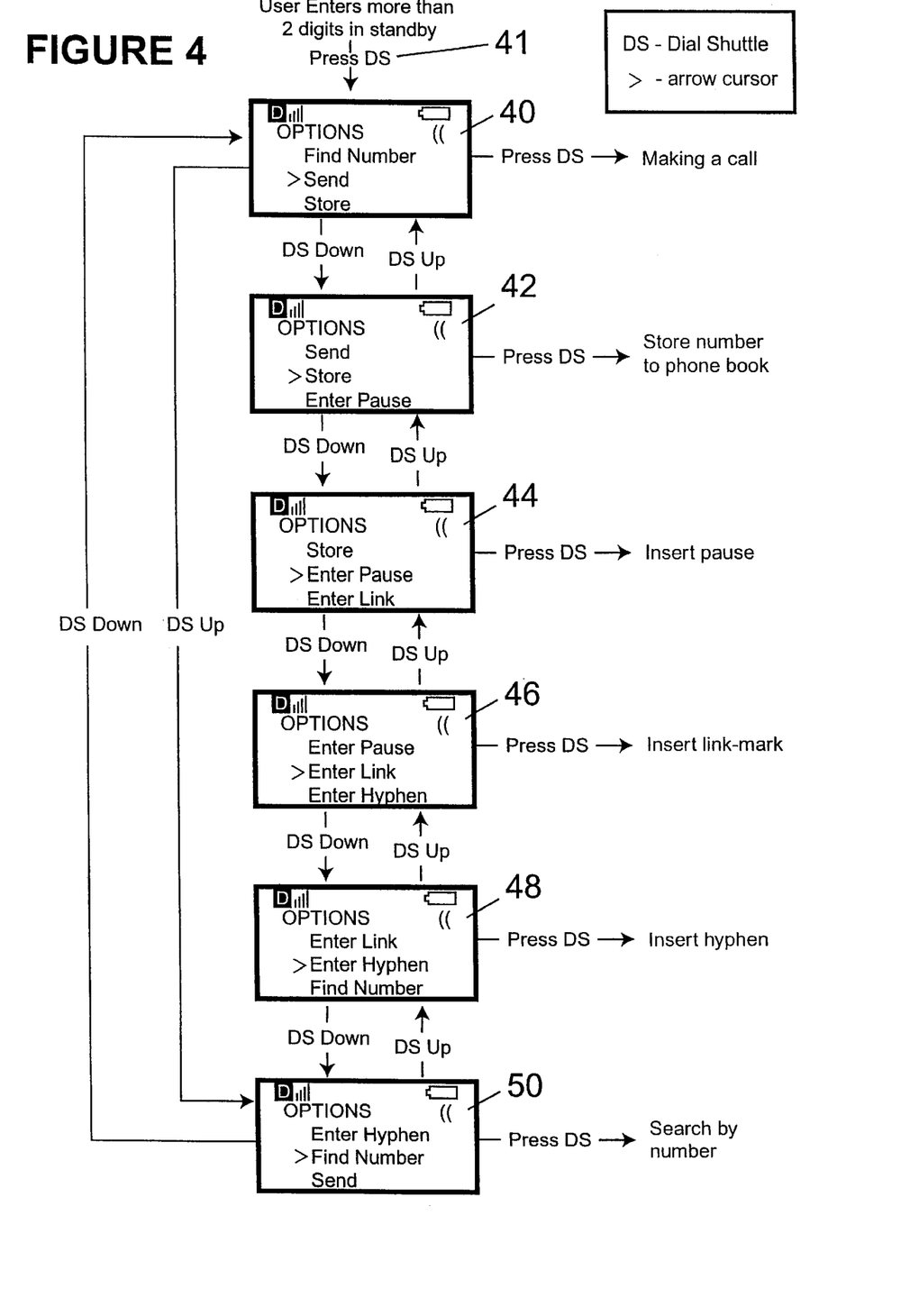
FIG. 4 is a schematic illustration of the display and the various functions performed by the cellular telephone of the present invention when using the dial shuttle.

Referring first to FIG. 3A, and particularly case 1 shown therein, the option list (also identified herein as an "option group") of case 1 represents the particular menu options that are displayed (or partially displayed due to the size restriction of display 14) and that may be selected when the user has already entered three or more digits in the standby mode of the cellular telephone (identified as the "context" in FIGS. 3A and 3B). That is, prior to the occurrence of a call (or after the termination of a call), if the user enters a telephone number using, for example, the digit keys of keys 18 and subsequently depresses dial shuttle 20, display 14 is driven (by appropriate control signals from controller 12 and appropriate drive signals from driver 16) to display the option list (group) corresponding to case 1 shown in FIG. 3A. In an alternative embodiment, the option list of case 1 also is displayed when dial shuttle 20 is moved into its up position or its down position, as well as when it is depressed. It is noted that while the present discussion is directed to the textual display of each option group (i.e., option list), as shown in FIGS. 3A, 3B and 4, each option group may be provided in the form of graphical representations of each option of the displayed option group, including the use of icons or other graphical representations of the functions thereof.

In accordance with the present invention, the option list of case 1 includes those selectable functions that may be selected for execution for cases (i.e., the "context" of) when three or more digits have been entered into the telephone in the standby mode. For example, the specific functions that would be utilized for the case when three or more digits already have been entered in standby mode include "Find Number" which represents the function of searching for a stored telephone number that includes the entered digits, "Send" which represents the function of dialing the entered number (identical to the function of the "SEND" key), "Store" which is the function of storing the entered number into a "telephone book" (stored in, for example, EEPROM 25), "Enter Pause" which performs the function of entering a pause mark into the telephone number, "Enter Link" which represents the function of entering a link mark (the user enters the location number of the phone book to which the user wants to connect), and "Enter Hyphen" which functions to enter a hyphen "–" mark into the entered telephone number (generally for purposes of making the telephone number more readable). The option list of case 1 is exemplary and may include other functions that are used after the user enters at least three digits in the standby mode.

However, and in accordance with the present invention, the option list of case 1 would not include an entry that would never be selected after the user has entered three or more digits in the standby mode. For example, a call "End" function or a mute function would not be selected except during the occurrence of a call and thus are not included in the option list of case 1.

A second mode of operation, identified as case 2 in FIG. 3A, is entered when the user has entered only one or two digits into the cellular telephone in the standby mode. In such case, the option list corresponding to case 2 shown in FIG. 3A is displayed on display 14 when dial shuttle 20 is depressed, such option list including the selectable options of "Recall Loc#", "Send", "Store", "Enter Pause", "Enter Link", and "Enter Hyphen".

The option "Recall Loc#" represents the function of recalling the telephone number from the telephone book that is stored at the entered address (i.e., from the one or two digit address entered by the user), and the other options of case 2 have been previously discussed. Comparing the option list of case 1 with that of case 2, it is seen that the selection "Recall Loc#" is not included in the option list of case 1 since the cellular telephone generally includes only 99 locations for storing user supplied telephone numbers. However, in an alternative embodiment, case 2 may represent the context of when the user has entered one, two or three digits in the standby mode, wherein cellular telephone 10 allows for the storage of more than 100 user supplied telephone numbers in more than 100 respective memory locations, and thus case 2 would allow the retrieval of a telephone number from a three-digit memory location (when "Recall Loc#" is selected).

In addition to displaying a menu (i.e., option list) having selectable options that are based on the particular operating mode or "context" of cellular telephone 10, the present invention further provides that when dial shuttle 20 is depressed the particular option that is initially selected (i.e., "highlighted" in the list, but not yet executed) corresponds to that entry in that option list that has the highest frequency of selection. In other words, and referring to case 1 of FIG. 3A, when dial shuttle 20 is depressed after the user enters at least three digits in the standby mode, the option list of case 1 is displayed and the most likely option therein (in the present case, "SEND") to be selected for execution (i.e., most chosen function) is highlighted. If the user depresses dial shuttle 20 after the option list is displayed, the most frequently chosen function "SEND" is executed. Thus, when the user enters three or more digits in the standby mode and depresses dial shuttle 20 two times in a row, the "Send" function is performed, wherein the option list of case 1 is displayed after dial shuttle 20 is depressed the first time and the highlighted function (in this case, "Send") is performed when dial shuttle 20 is depressed the second time.

When the user wants to select another function other than "Send" (after the first-time depression of dial shuttle 20), the user moves dial shuttle 20 in either its up position or its down position in order to "scroll" through the option list. During such scrolling, a different option is highlighted each time dial shuttle 20 is moved up or down, wherein the selection above the highlighted option is highlighted (and the previously highlighted option becomes not highlighted) when dial shuttle 20 is moved up, and the option below the highlighted option becomes highlighted when dial shuttle 20 is moved down. In accordance with the present invention, in addition to initially highlighting (i.e., selecting) the most frequently selected option when an option list is displayed, the present invention further provides that the options in the displayed option list above and below the initially highlighted option correspond to the second-most and third-most frequently selected functions in the particular operating mode of cellular telephone 10 (i.e., for the particular case). For example, and still referring to case 1 of FIG. 3A, the functions "Find Number" and "Store" (which are positioned adjacent to the first-highlighted option "Send") represent those functions that the user is next likely to select (after "Send"). Thus, to perform either the second or third-most selected functions during a particular case (operating mode) the user only needs to depress dial shuttle 20 a first time (to bring up the option list), followed by a single up or down motion of dial shuttle 20 to select the second or third-most used function, followed by a second-time depression of dial shuttle 20 to carry out execution of the selected option. Similarly, the fourth and fifth-most selected options are located adjacent to the second and third (or third and second) most selected options, respectively, and so on. Thus, while there may be between, for example, two and ten options in each option list, generally only one or two up or down motions of dial shuttle 20 are necessary to select a desired function to be performed. Of course, and as previously discussed, up or down motion of dial shuttle 20 is not necessary to perform the most frequently used function in each of the option lists, which are executed simply by depressing dial shuttle 20 two times in a row.

Cellular telephone 10 of the present invention also includes other option lists that are displayed when dial shuttle 20 is depressed during other operating modes ("operating mode" including the number of entered digits as well as whether the telephone is in the standby mode or the call mode). The other option lists correspond to cases 3–11 shown in FIGS. 3A and 3B and these cases and their corresponding option lists are further discussed below. But before the descriptions of cases 3–11 are provided, a detailed discussion of the operation of dial shuttle 20 will be described with reference to FIG. 4.

FIG. 4 is a schematic illustration of the various displays of display 14 and operations of cellular telephone 10 when dial shuttle 20 is utilized after the user has entered at least three digits in the standby mode (i.e., case 1). As shown, display 40 represents what is displayed in display 14 (FIG. 2) when the user has entered three or more digits in the standby mode and subsequently moves dial shuttle 20 into its depressed position (represented by "Press DS" instruction 41 in FIG. 4). In one embodiment of the present invention, display 14 includes four text lines in which textual information are provided. Display 14 may also include other lines in which other types of information are displayed including, for example, signal strength, strength of battery, etc. The first text line includes the word "OPTIONS" to indicate that an option menu is being displayed, and the second through fourth lines include three of the options of the selected option list. Thus, and as shown in ISL: display (or image) 40, the options that are displayed after dial shuttle 20 is depressed are "Find Number", "Send", and "Store".

In addition, the first option highlighted, or, in the alternative embodiment of the display shown in FIG. 4, that includes a ">" adjacent thereto, is "Send" (as indicated by the arrow cursor ">"). At this point, the user may depress dial shuttle 20 in order to make a call, move dial shuttle 20 down in order to highlight "Store" (display 42), or move dial shuttle up to highlight "Find Number" (display 50). As shown in either of displays 42 or 50, moving dial shuttle 20 up or down causes the option list to be scrolled, but for readability purposes, the "highlighted" option is provided in the middle of the three displayed options. Then, when, for example, "Store" is "highlighted" (display 42), the user may depress dial shuttle 20 to carry out the function of storing the entered number into the telephone book, or move dial shuttle 20 up or down again in order to select a different option. Therefore, displays 40, 42, 44, 46, 48 and 50 represent what is displayed in display 14 as dial shuttle 20 is moved up or moved down thus scrolling up or scrolling down the particular option list. The other option lists, shown in FIGS. 3A and 3B, corresponding to cases 2–11, are scrolled in a similar manner using dial shuttle 20.

Referring again to FIG. 3A, case 3 therein represents the operating mode of cellular telephone 10 when the user enters three or more digits during the occurrence of a call (identified herein as "in call mode"). When dial shuttle 20 is depressed in this operating mode, the option list that is displayed (or partially displayed) includes the options "Mute", "Send", "Store", "Number Tone", "Find Number", "Enter Pause", "Enter Link", and "Enter Hyphen". The option "Mute" represents the function of muting the microphone during the call, the option "Number Tone" represents the function of sending a DTMF tone, and the other options of case 3 have been previously discussed. Therefore, the option list of case 3 represents those functions that the user may want to perform during a call and after three or more digits are entered into cellular telephone 10. Still further, the first highlighted option "Send" and the adjacent options thereto of "Mute" and "Store" represent the most frequently selected functions during this particular operating mode.

The fourth mode of operation, identified as case 4 in FIG. 3A, is entered when the user inputs only one or two digits in the call mode. During this operating mode, the option list that is displayed when dial shuttle 20 is depressed includes "Mute", "Send", "Store", "Number Tone", "Recall Loc#", "Pause", "Enter Link", and "Enter Hyphen".

The fifth mode of operation is shown as case 5 in FIG. 3B, and the option list of case 5 is displayed when the user has recalled a number from the telephone book in the standby mode and subsequently depresses dial shuttle 20. The option list for case 5 includes "Erase", "Send", "Edit", "Restriction", and "View Number". Unlike previously described cases 1–4, the option list of case 5 includes the functions "Erase" which erases the displayed number from the phone book, "Edit" which allows the user to edit the displayed number in the telephone book, "Restriction" which restricts the number in the phone book to particular persons and is achieved, for example, by requiring the user to enter a password (e.g., a user-supplied password) to access the restricted number, and "View Number" which displays the "Overflow" digits that previously are not displayed due to the restricted digit length of display 14.

Case 6, shown in FIG. 3B, represents the sixth mode of operation and occurs when the user has recalled a number from the telephone book in call mode, and the option list for case 6 includes "Mute", "Send", "Edit", "Erase", "Restriction", "View Number", and "Number Tone".

The seventh mode of operation, case 7 in FIG. 3B, represents when the user has recalled a number using a call history function in the standby mode, and when dial shuttle 20 is depressed. The option list that is displayed includes "Store", "Send", "Duration", "Time/Date", "View Number", "Erase", and "Number Tone". The function "Duration" displays the length (e.g., minutes, seconds) of the previous telephone call that was displayed from a "Call History" function, and the function "Time/Date" displays the time and date at which the displayed call was made.

The next mode of operation, case 8 in FIG. 3B, represents when the user recalls a telephone number from "Call History" in call mode, and the option list displayed for this case includes "Mute", "Send", "Store", "Duration", "Time/Date", "View Number", "Erase", and "Number Tone".

The next mode of operation, represented by case 9 in FIG. 3B, represents when the user enters a number into the scratch pad (in a scratch pad mode) in standby mode, and the option list for case 9 includes "Enter Pause", "Store", "Enter Link", and "Enter Hyphen".

The tenth mode of operation, shown as case 10, represents when the user enters a number into the scratch pad in call mode, wherein the option list for this case includes "Mute", "Store", "Enter Pause", "Enter Link", "Enter Hyphen", and "Number Tone".

The eleventh mode of operation, shown as case 11, represents when a call back number in SMS (Short Message Service)/VMA (Voice Mail Alert) is displayed, and the option list for this case includes "Send" and "Store".

As seen from the above description of the various modes of operation of cellular telephone 10, corresponding to cases 1–11 shown in FIGS. 3A and 3B, it is seen that "custom-like" option lists for every particular type of operating mode (which takes into account the entered number of digits) are provided simply by depressing dial shuttle 20. Still further, each option list is ordered in such a manner so that the first highlighted option represents that function (in the particular option list) that is most frequently selected by the user and those options adjacent thereto are next most frequently selected by the user. It is noted, however, that cases 1–11 shown in FIGS. 3A and 3B are not the only operating modes of cellular telephone 10, and the options in each of the option lists disclosed and described herein may include additional user selectable functions including, for example, the above-mentioned "Call History" function.

Figure 5:
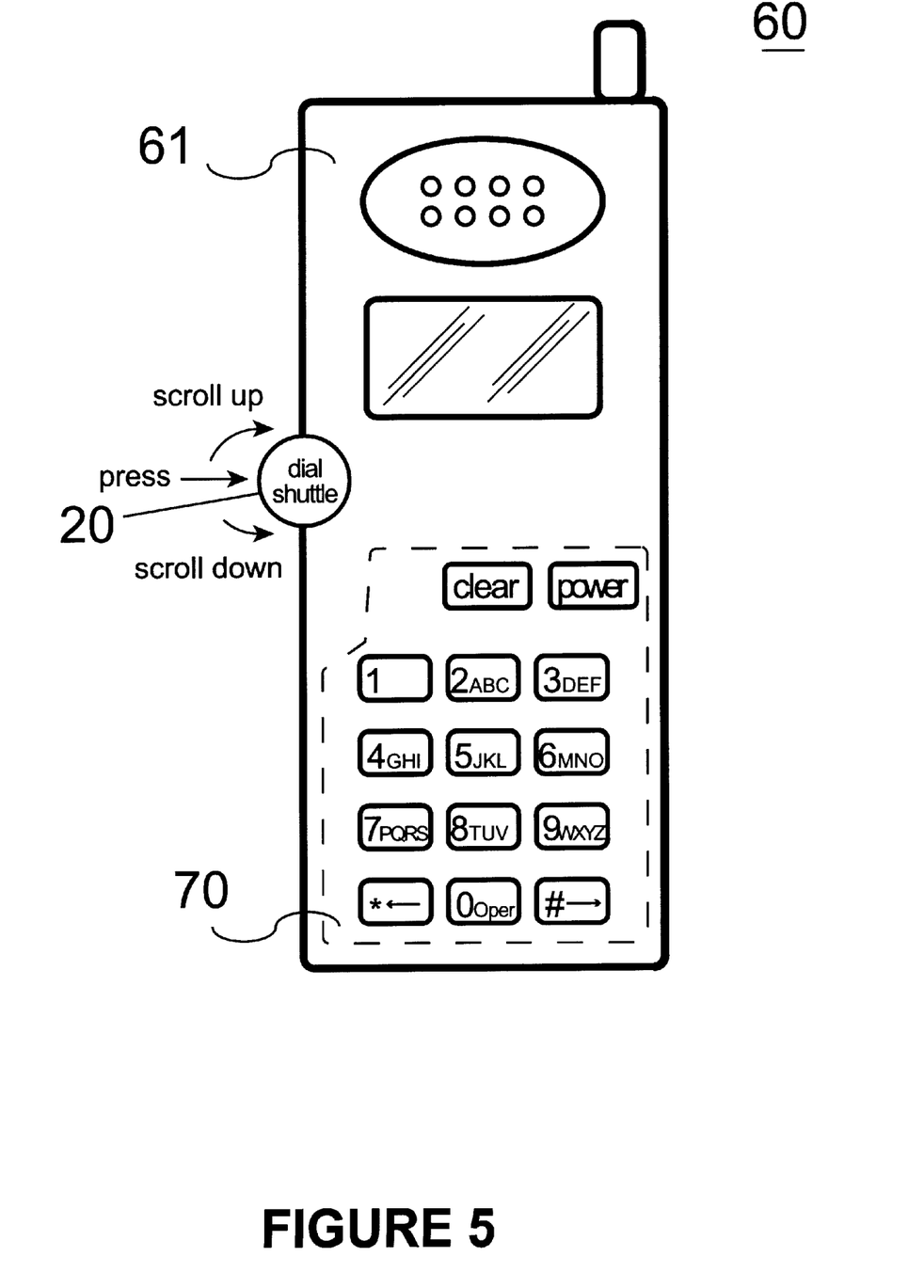
FIG. 5 schematically illustrates the face of the cellular telephone in accordance with another embodiment of the present invention.

FIG. 5 is a schematic illustration of the face 61 of cellular telephone 60 in accordance with another embodiment of the present invention. As shown, cellular telephone 60 is substantially similar to the above-described cellular telephone 10, except face 61 does not include the "SEND" and "END" keys.

Since the option lists may include the function "Send", as previously discussed, and the particular option lists displayed for cases in call mode may include the option "End", the "SEND" and "END" keys may be removed from the face of the cellular telephone without making the operation thereof more difficult. In this embodiment, and also in the above-discussed embodiment, a call is made simply by entering the telephone number and depressing dial shuttle 20 two times in a row. To end the call, the user may, for example, depress dial shuttle 20, wherein the option list that is displayed when no numbers are entered and the cellular telephone is in the call mode includes the first highlighted option of "End". Of course, the arranged order of selectable options in such an option list is a function of the frequency of use thereof.

The present invention may further be applied to remove still yet other keys from the face of the cellular telephone, including the "Clear" and "Power" keys, wherein depression of dial shuttle 20 functions as the "Power" key when the cellular telephone is off. Thus, it is seen from the above discussion that dial shuttle 20 may be utilized to perform any function of cellular telephone 10 including those related to input telephone numbers as well as those not related to telephone numbers. For example, the appropriate option lists may include options directed to volume control, display intensity, battery power remaining, etc.

The foregoing discussion of the cellular telephone of the present invention has been described as displaying a particular one of a number of option lists or menus. In a preferred embodiment of the present invention, such option lists are pre-stored in the celullar telephone's memory (i.e., either ROM 22 or EEPROM 25). However, in an alternative embodiment of the present invention, such data is not pre-stored and is instead compiled or constructed on the fly. That is, each option list is generated by, for example, controller 12 as the need arises, for example, as when the user depresses dial shuttle 20 in a particular operating mode, and the generated option list then is temporarily (e.g., in RAM 24) or, alternatively, permanently stored in memory.

While the present invention has been particularly shown and described in conjunction with preferred embodiments thereof, it will be readily appreciated by those of ordinary skill in the art that various changes may be made without departing from the spirit and scope of the invention. For example, utilization of a dial shuttle is not limited to cellular telephones, and may be incorporated into other devices including television remote controls, stereo remote controls, beepers, and any other device in which it is desired to limit the number of input keys therein.

As another example, although the present discussion is directed to the display of option lists, the present invention is not limited solely to textual display of such lists and may display such lists or "groupings of functions" in the form of graphical displays. As a further example, although the present discussion provides for a dial shuttle which is depressed to call up a particular option menu, and then moved to scroll through the option menu, such may be performed without the dial shuttle by the use of a touch-screen display or by voice activation capability.

Therefore, it is intended that the appended claims be interpreted as including the embodiments described herein, the alternatives mentioned above, and all equivalents thereto.

What is claimed is:

1. A communication terminal apparatus which is in a call mode during the occurrence of a telephone call and in a standby mode during non-occurrence of a telephone call, comprising:

an input device operable to receive an input by a user;

storage means for storing option list data corresponding to a plurality of option groups, each of said option groups being associated with a respective operating mode of the communication terminal apparatus, and each of said option groups including at least one function for selection by a user during the respective operating mode;

display means for displaying, when said input device receives an input by the user, at least a portion of said one option group stored in said storage means associated with a current operating mode of the communication terminal apparatus;

input keys for entering data by the user; and operation mode determining means for determining the current operating mode of the communication terminal apparatus as a function of both the entered data and whether the apparatus is in call mode or standby mode.

2. A communication terminal apparatus, comprising:

a user movable input device operable to receive an input by a user;

storage means for storing option list data corresponding to a plurality of option groups, each of said option groups being associated with a respective operating mode of the communication terminal apparatus, and each of said option groups including functions for selection by a user during the respective operating mode;

display means for displaying, when said input device receives an input by the user, at least a portion of said one option group stored in said storage means associated with a current operating mode of the communication terminal apparatus, said display means further displaying an indicator identifying to the user at least one function of the displayed option group to be performed upon receipt of an execution instruction from the user, wherein a different function of the displayed option group is identified by said display means each time the input device is moved;

means separate from the input device for entering data by the user;

operation mode determining means for determining the current operating mode of the communication terminal apparatus as a function of the entered data; and means for controlling the display means to scroll through each function in response to movement of the input device, wherein the indicator displayed by said display means initially identifies a most frequently selected function of the displayed option group when said input device receives an input.

3. The communication terminal apparatus of claim 2, wherein a function adjacent to the most frequently selected function of the displayed option group represents a second-most frequently selected function; and wherein said means for controlling the display means operates to control, when the input device is initially moved after the option group is initially displayed, the display means to display an indicator identifying the second-most frequently selected function.

4. The communication terminal apparatus of claim 2, wherein two functions adjacent to the most frequently selected function of the displayed option group represent second and third-most frequently selected functions; and wherein said means for controlling the display means operates to control, after the option group is initially displayed, the display means to display an indicator identifying the second-most frequently selected function when the input device is moved to one of first and second predetermined positions, and identifying the third-most frequently selected function when the input device is moved to another of said first and second predetermined positions.

5. Method of selecting options in a communication terminal apparatus which is in a call mode during occurrence of a telephone call and in a standby mode during non-occurrence of a telephone call, comprising the steps of:

operating an input device during a current operating mode of the communication terminal apparatus;

retrieving option list data corresponding to one of a plurality of stored option groups associated with the current operating mode of the communication terminal apparatus, each of the stored option groups being associated with a respective operating mode of the communication terminal apparatus, and each of the option groups including at least one function for selection by a user during the respective operating mode;

displaying, when the input device receives an input by the user, at least a portion of the retrieved option group including the at least one function for selection by the user during the current operating mode;

entering data using input keys before entering an input to the input device which allows scrolling through said option groups; and determining the current operating mode of the communication terminal apparatus as a function of both the entered data and whether the apparatus is in call mode or standby mode.

6. Method of selecting options in a communication terminal apparatus, comprising the steps of:

operating an input device during a current operating mode of the communication terminal apparatus;

retrieving option list data corresponding to one of a plurality of stored option groups associated with the current operating mode of the communication terminal apparatus, each of the stored option groups being associated with a respective operating mode of the communication terminal apparatus, and each of the option groups including functions for selection by a user during the respective operating mode;

displaying, when the input device receives an input by the user, at least a portion of the retrieved option group including at least one function for selection by the user during the current operating mode;

entering data using input keys before entering an input to the input device which allows scrolling through said option groups;

determining the current operating mode of the communication terminal apparatus as a function of the entered data, displaying to the user an indicator identifying a function of the displayed option group to be performed upon receipt of an execution instruction from the user, wherein an indicator is initially displayed identifying a most frequently selected function of an initially displayed option group; and scrolling through each function of the displayed option group in response to movement of the input device, the displayed indicator identifying a different function of the displayed option group as the option group is scrolled.

7. The method of claim 6, wherein a function adjacent to the most frequently selected function of the displayed option group represents a second-most frequently selected function; and wherein the step of displaying an indicator is carried out by displaying an indicator identifying the second-most frequently selected function when the input device is moved a first time.

8. The method of claim 6, wherein two functions adjacent to the most frequently selected function of the displayed option group represent second and third-most frequently selected functions; and wherein the step of displaying an indicator is carried out by displaying an indicator identifying the second-most frequently selected function when the input device is moved to one of first and second predetermined positions, and identifying the third-most frequently selected function when the input device is moved to another of said first and second predetermined positions.

9. A communication terminal apparatus being in a call mode during occurrence of a telephone call and being in a standby mode during non-occurrence of a telephone call, comprising:

an input device operable to receive an input by a user;

storage means for storing option list data corresponding to a plurality of option groups, each of said option groups being associated with a respective operating mode of the communication terminal apparatus, and each of said option groups including at least one function for selection by a user during the respective operating mode;

display means for displaying, when said input device receives an input by the user, at least a portion of one of said option groups stored in said storage means associated with a current operating mode of the communication terminal apparatus;

means separate from the input device for entering data by the user;

operation mode determining means for determining the current operating mode of the communication terminal apparatus as a function of both the amount of the entered data and whether the apparatus is in call mode or standby mode.

10. Method of selecting options in a communication terminal apparatus operable to place a telephone call, such that the communication terminal apparatus is in a call mode during occurrence of a telephone call and is in a standby mode during non-occurrence of a telephone call; said method comprising the steps of:

operating an input device during a current operating mode of the communication terminal apparatus;

retrieving option list data corresponding to one of a plurality of stored option groups associated with the current operating mode of the communication terminal apparatus, each of the stored option groups being associated with a respective operating mode of the communication terminal apparatus, and each of the option groups including at least one function for selection by a user during the respective operating mode;

displaying, when the input device receives an input by the user, at least a portion of the retrieved option group including the functions for selection by the user during the current operating mode;

entering data using input keys before entering an input to the input device which allows scrolling through said option groups; and determining the current operating mode of the communication terminal apparatus as a function of both the amount of the entered data and whether the apparatus is in call mode or standby mode.

* * * * *